United States Patent [19]

Cuervo

[11] Patent Number: 4,718,009
[45] Date of Patent: Jan. 5, 1988

[54] DEFAULT PROOF CREDIT CARD METHOD SYSTEM

[75] Inventor: Vincent Cuervo, Dade County, Fla.

[73] Assignee: Default Proof Credit Card System, Inc., Coral Gables, Fla.

[21] Appl. No.: 739,690

[22] Filed: May 31, 1985

Related U.S. Application Data

[63] Continuation-in-part of Ser. No. 583,591, Feb. 27, 1984, abandoned.

[51] Int. Cl.⁴ .............................................. G06F 15/21
[52] U.S. Cl. ..................................... 364/408; 364/900
[58] Field of Search ............... 364/408, 200 MS File, 364/900 MS File, 400

[56] References Cited

U.S. PATENT DOCUMENTS

| | | | |
|---|---|---|---|
| 3,949,191 | 4/1976 | Crowther | 235/380 |
| 4,194,242 | 3/1980 | Robbins | 364/200 |
| 4,346,442 | 8/1982 | Musmanno | 364/408 |
| 4,376,978 | 3/1983 | Musmanno | 364/408 |
| 4,454,414 | 6/1984 | Benton | 235/381 X |
| 4,590,365 | 5/1986 | Okada | 235/379 |

Primary Examiner—Jerry Smith
Assistant Examiner—Charles B. Meyer
Attorney, Agent, or Firm—John H. Faro

[57] ABSTRACT

A method and system for credit card issuers with cardholders that own insurance policies with surrender cash values in them. The method and system include the use of computerized and information storage systems for obtaining information storage systems for obtaining information from each participating cardholder. The system uses this information to compute a line of credit that is transmitted to the participating bank that issue the conventional cards. Since the system has an assignment of the equity of each policy, it can extend the line of credit with virtually no risk of default.

4 Claims, 1 Drawing Figure

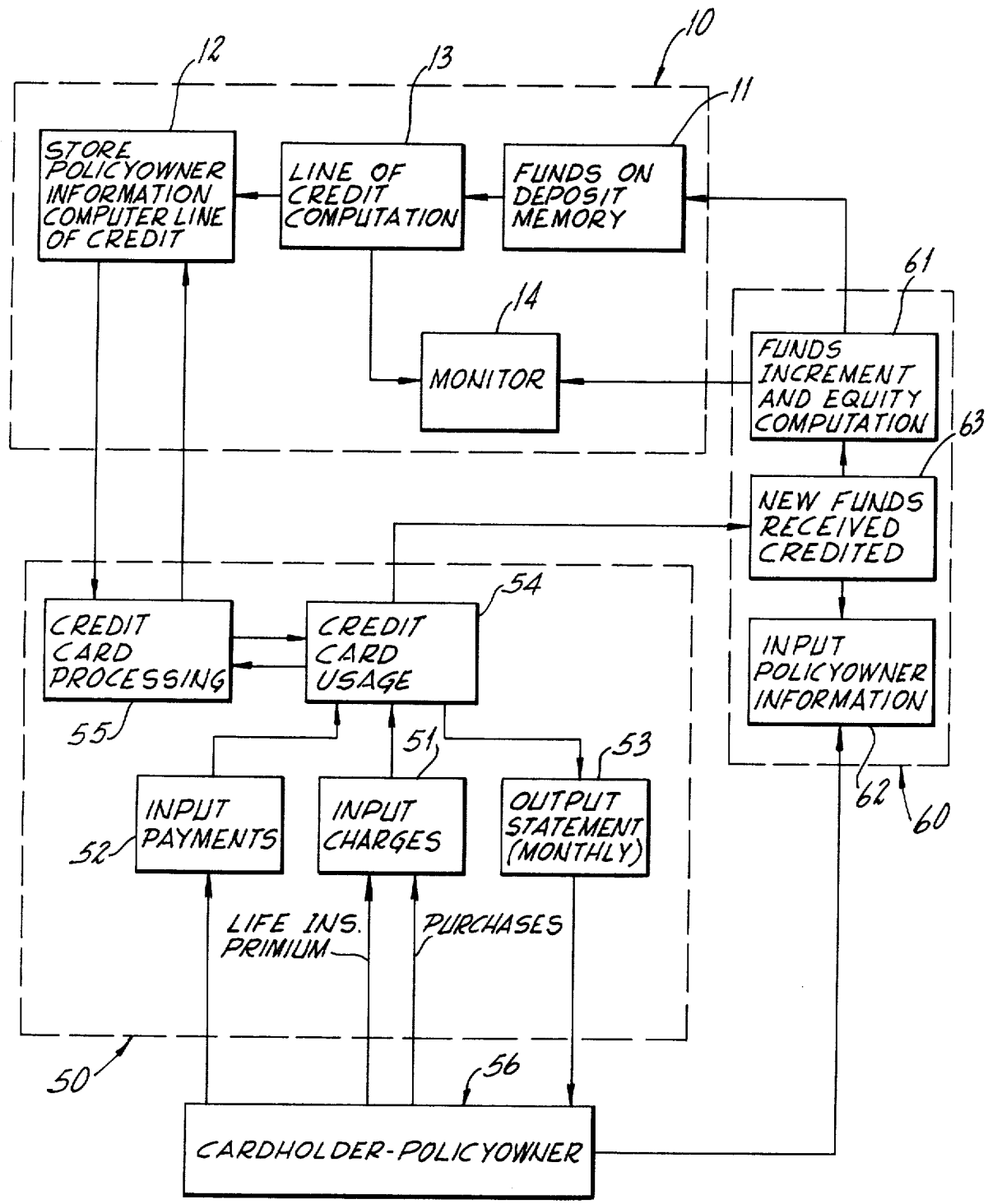

DEFAULT PROOF CREDIT CARD METHOD SYSTEM

OTHER RELATED APPLICATIONS

The present application is a continuation-in-part of pending U.S. application No. 06/583,591 filed on Feb. 27, 1984 and now abandoned.

BACKGROUND OF THE INVENTION

1. Field of the Invention

The present invention relates to financial business systems, and more particularly to data processing methods and apparatus for extending lines of credit to life insurance policyowners.

2. Description of the prior art

It is a common practice for life insurance companies to extend loans to policyowners using the cash value of their policies, and consequently, reducing the face amount of the policy by an amount equal to the size of the loan. The interest charged to policyowners is relatively low since the collateral is of high quality. Life insurance companies, however, need substantial personnel to administer and service these loans. Policyowners are reluctant to borrow against their policies because they do not want to deteriorate their life insurance arrangements and also fear the stringent penalties for default.

The insurance companies have better alternate prospects for investing their policyowners' cash value funds, specially, in view of the high cost of administration.

The other alternative for the policyholder is to borrow through the conventional bank credit cards at high interest rates, usually 1.5% per month. Banks have to charge this high rate, which usually corresponds to the maximum allowed by law, because of the high risk involved. Presently, the default ratio exceeds 2.1% annually. The present invention will practically eliminate defaults with credit cards by using the cash value funds held by the insurance companies as collateral and the borrower will benefit by receiving a lower interest rate reflecting lower administrative and default costs.

The closest prior art corresponds to U.S. Pat. Nos. 4,376,978 and 4,346,442 issued to Musmano and assigned to Merrill Lynch Pierce Fenner & Smith, Inc. There, a cash management system coordinates a user's transactions so that his assets may be readily available in an efficient manner by causing changes in his charge media, short term money fund account and/or his securities brokerage account. These patents, however, do not even suggest a system that utilizes the cash value inherent in life insurance policies.

Another patent relating to a financial method and system is U.S. Pat. No. 4,194,242 issued to Robbins. Here, the interest rate of a loan is automatically adjusted depending on the ratio of the borrower's funds on deposit to his outstanding indebtedness. Again, no mention is made here of life insurance cash values, the inherent characteristics of these assets or how to unlock them for an efficient utilization by a user.

Other patents describing the closest subject matter provide for a number of more or less complicated features that fail to solve the problem in an efficient and economical way. None of these patents suggest the novel features of the present invention.

SUMMARY OF THE INVENTION

It is the main object of the present invention to provide a novel system for determining the line of credit for credit card users based on their life insurance policies' cash value.

It is another object of the present invention to provide a system that provides an ever increasing line credit to the user commensurate with their increasing life insurance cash value.

It is yet another object of the present invention to provide such a system that requires a minimum of administration and servicing since the heresofar characteristic risks associated with the credit card business are practically eliminated.

Still another object of the present invention to provide a system for issuing credit cards without requiring credit history checks.

Still another object of the present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 shows a block representation of the system.

DETAILED DESCRIPTION OF THE PREFERRED EMBODIMENT

Referring now to FIG. 1, the default-proof credit card system is generally referred to with numeral 10. Basically, system 10 will be offered to banking institutions 50 already licensed or franchised by bank credit cards such as VISA and MASTER CHARGE so that its cardholders may use the equity in their insurance policies as collateral. For the purpose of this application the term "cardholder" and "policyholder" are interchangeable.

Funds on deposit memory bank 11 is a conventional random and/or sequentially access memory device where the equity information of each policy is stored. This equity information includes a policy's cash value, dividends, accumulated dividends and/or paid up dividend addition cash value and it is fed to processor 13 periodically so that the line of credit for each policyholder/cardholder is computed. Policyowner memory bank 12 will contain information regarding the individual policyowner and the periodically updated line of credit computed.

System 10 is linked to participating insurance companies 60 (only one is shown in FIG. 1) and to authorized bank credit card issuing entities 50.

A participating cardholder assigns the rights over his or her insurance policy equity to the benefit of system 10 through an equity assignment form. The system 10 obtains enough information regarding his policy either directly or by authorizing his or her insurance carrier 60 to do so. Insurance carrier 60 periodically informs system 10 through processor 61 as to what the equity position is of the participating policyholders. This is done depending on the provisions of each policy which are set by the respective carrier. The policyholder 56 continues its business relationship with carrier 60 which obtains information and/or enters into new contractual provisions with him or her. For example, the policy may be changed, namely, the beneficiaries changed, etc. Carrier 60 will continue to conduct business as usual with the exception of the troublesome extension of loans and the collection thereof which now is coordinated by system 10 and easily made available to the policyholder via a bank credit card of relatively low cost. Policyholder 56 has the choice of either paying the insurance premium directly to carrier 60 or charging it automatically to the credit card. Bank 50 receives its cardholder's charges and payments through input charges systems 51 and 52 which generate a monthly output statement 53 in a conventional fashion. The credit card usage is computed in bank's processor system 54 which compares it with the line of credit approved by system 10. Bank 50 is assured that system 10 will cover card expenditures for up to the amount of the line credit which more than likely will be raised by the time the next periodic update comes. This eliminates the need of engaging in credit history applications and checking which are time consuming activities that augment the overhead of the operation, and consequently, the interest rates charge to the cardholders may be lowered.

System 10 will receive compensation from the participating banks 50 in any manner that is suitable depending on the economic circumstances. For example, it may charge a fixed fee for each card issued by the bank, or a charge may be assessed proportional to the transaction activities of the cardholder, etc.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A method for providing line of credit information to participating banks that issue charge cards to owners of life insurance policies wherein the cash surrender value of said life insurance policies has been assigned to a system, which provides credit information to said participating bank, by said owner to secure a charge card line of credit to the owner of the life insurance policies, comprising the steps of:
   A. providing a system for storing and periodically updating the cash surrender values of the assigned life insurance policies in a computer memory;
   B. computing said line of credit for a charge card holder based on said cash surrender values stored for each policy owner;
   C. transmitting said line of credit information from said system to participating banks; and
   D. monitoring periodically the assigned life insurance policies with said system for any incremental increase of said cash surrender values so that the line of credit for the charge card holder may be automatically upgraded.

2. The method set forth in claim 1 wherein said step of computing the line of credit is done with a general purpose computer and said step of transmitting said line of credit is done through modem means connected through the public telephone lines network to said participating banks.

3. A system for providing line of credit information to participating banks that issue charge cards to owners of life insurance policies wherein the cash surrender value of said life insurance policies have been assigned to said system, which provides credit information to participating banks, by said owners to secure the charge card line of credit to the owner of the life insurance policies, comprising
   A. memory means for storing and periodically updating said cash surrender values of assigned life insurance policies;
   B. means for computing said line of credit from said stored cash surrender values of the assigned insurance policies according to a pre-determined formula;
   C. means for transmitting said computed line of credit information from said system to said participating bank; and
   D. means for periodically monitoring the assigned life insurance policies for any incremental increase of said cash surrender value so that the line of credit of the charge card holder may be automatically upgraded in said system.

4. The system set forth in claim 3 wherein said means for computing includes a general purpose computer and said means for transmitting includes modem means connected to said participating banks through the public telephone lines network.

* * * * *